United States Patent
Vankelecom et al.

(10) Patent No.: US 11,554,346 B2
(45) Date of Patent: Jan. 17, 2023

(54) CROSS-LINKED NANOFILTRATION MEMBRANES

(71) Applicant: Katholieke Universiteit Leuven, Leuven (BE)

(72) Inventors: Ivo Vankelecom, Oud-Heverlee (BE); Cédric Van Goethem, Haasrode (BE); Matthias Mertens, Wingene (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 0 days.

(21) Appl. No.: 16/963,342

(22) PCT Filed: Jan. 25, 2019

(86) PCT No.: PCT/EP2019/051867
§ 371 (c)(1),
(2) Date: Jul. 20, 2020

(87) PCT Pub. No.: WO2019/145481
PCT Pub. Date: Aug. 1, 2019

(65) Prior Publication Data
US 2021/0060490 A1    Mar. 4, 2021

(30) Foreign Application Priority Data
Jan. 25, 2018  (GB) ..................................... 1801230

(51) Int. Cl.
| | | |
|---|---|---|
| *B01D 61/02* | (2006.01) |
| *B01D 71/34* | (2006.01) |
| *B01D 65/02* | (2006.01) |
| *B01D 67/00* | (2006.01) |
| *B01D 7/00* | (2006.01) |

(52) U.S. Cl.
CPC ........... *B01D 61/027* (2013.01); *B01D 65/02* (2013.01); *B01D 67/0095* (2013.01); *B01D 71/34* (2013.01); *B01D 2257/60* (2013.01); *B01D 2258/0275* (2013.01); *B01D 2323/30* (2013.01); *B01D 2325/02* (2013.01)

(58) Field of Classification Search
CPC ...... B01D 61/027; B01D 65/02; B01D 71/34; B01D 2257/60; B01D 2258/0275; B01D 2323/30; B01D 2325/30
See application file for complete search history.

(56) References Cited

U.S. PATENT DOCUMENTS

| | | | | |
|---|---|---|---|---|
| 6,204,231 B1* | 3/2001 | Patten | ............... | C11D 17/0056 510/218 |
| 6,770,202 B1 | 8/2004 | Kidd et al. | | |
| 8,552,623 B2 | 10/2013 | Choi et al. | | |
| 2009/0314712 A1* | 12/2009 | Skou | ...................... | B01D 61/58 210/636 |
| 2012/0273421 A1* | 11/2012 | Perry | ................... | B01D 61/145 210/651 |
| 2014/0339468 A1* | 11/2014 | Ante | ....................... | C01G 3/12 252/189 |
| 2018/0251386 A1* | 9/2018 | Wang | ..................... | B01D 61/20 |

FOREIGN PATENT DOCUMENTS

| | | |
|---|---|---|
| CN | 102151498 A | 8/2011 |
| CN | 102924732 A | 2/2013 |
| EP | 574957 A2 | 12/1993 |
| WO | 9603202 A1 | 2/1996 |
| WO | 2006073867 A1 | 7/2006 |
| WO | 2006135966 A1 | 12/2006 |
| WO | 2010082194 A2 | 7/2010 |
| WO | 2012010889 A1 | 1/2012 |
| WO | 2014137721 A1 | 9/2014 |
| WO | WO-2017039859 A1 * 3/2017 ............. E21B 43/36 |

OTHER PUBLICATIONS

Solomon, Maria Fernanda Jimenez, Yogesh Bhole, and Andrew Guy Livingston. "High flux membranes for organic solvent nanofiltration (OSN)—Interfacial polymerization with solvent activation." Journal of membrane science 423 (2012): 371-382. (Year: 2012).*
Al-Zoubi, H., et al. "Nanofiltration of acid mine drainage." Desalination and Water Treatment 21.1-3 (2010): 148-161. (Year: 2010).*
Mulder, M., "Basic Principles of Membrane Technology, Second Edition." Kluwer Academic Publishers, Dordrecht, (1996) 564.
Faguet et al., "Crosslinking of Vinylidene Fluoride-Containing Fluoropolymers," Adv. Polym. Sci. (2005) 127211.
Le-Clech et al., "Fouling in membrane bioreactors used in wastewater treatment," (2006) J. Memb. Sci. 284, 1753.
Schlesinger et al., "Evaluation of alkali resistant nanofiltration membranes for the separation of hemicellulose from concentrated alkaline process liquors," (2006) Desalination. 192, 303314.

(Continued)

*Primary Examiner* — Bradley R Spies
(74) *Attorney, Agent, or Firm* — Dinsmore & Shohl, LLP

(57) ABSTRACT

The invention relates to the use of an uncoated cross-linked non-pyrolysed selective vinyl based halopolymer-membrane with a mwco of between 100 and 1000 Da, in the filtration of compounds from liquids comprising organic solvents and/or from liquids with a pH below 2 or above 12.

18 Claims, 10 Drawing Sheets

(56) References Cited

OTHER PUBLICATIONS

Figure 1:
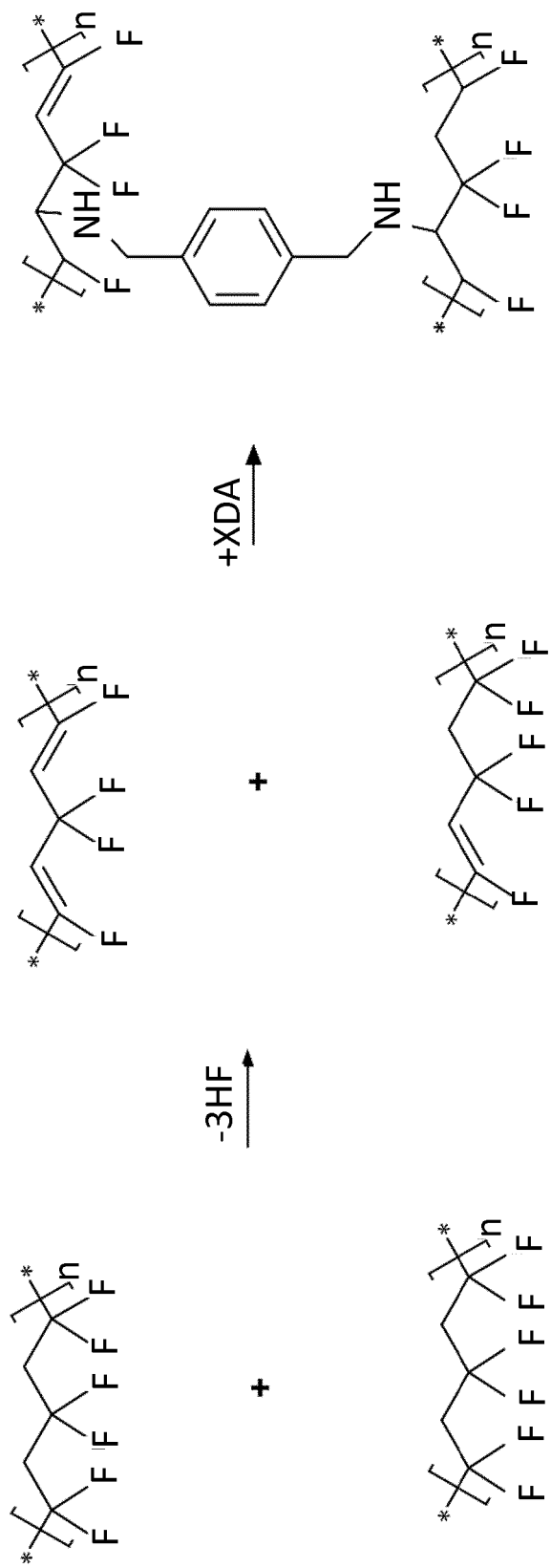

D. Jeison and Jules Van Lier, "Cake formation and consolidation: Main factors governing the applicable flux in anaerobic submerged membrane bioreactors (AnSMBR) treating acidified wastewaters," (2007) Sep. Purif. Technol. 56, 7178.
Vandezande et al., "Solvent resistant nanofiltration: separating on a molecular level," (2008) Chem. Soc. Rev. 37, 365405.
Beril Gonder et al., "Advanced treatment of pulp and paper mill wastewater by nanofiltration process: Effects of operating conditions on membrane fouling," (2011) Sep. Purif. Technol. 76, 292302.
Dalwani, et al., "Sulfonated poly(ether ether ketone) based composite membranes for nanofiltration of acidic and alkaline media," (2011) Journal of Membrane Science, 381, 8189.
Tao M., et al., "Effect of solvent power on PVDF membrane polymorphism during phase inversion," (2013) Desalination, 316, 137145.
Valtcheva et al., "Beyond Polyimide: Crosslinked polybenzimidazole membranes for organic solvent nanofiltration (OSN) in harsh environments," (2014) J. Memb. Sci. 457, 6272.
Vanysacker et al., "Effect of chemical cleaning and membrane aging on membrane biofouling using model organisms with increasing complexity," (2014) J. Memb. Sci. 457, 1928.
Cui et al., "Crystalline polymorphism in poly(vinylidenefluoride," (2015) Progress in Polymer Science 51, 94126.
Lee et al. "pH stable thin film composite polyamine nanofiltraion membranes by interfacial polymerisation," (2015) Journal of Membrane Science, 478, 7584.
Piasecka et al., "Study of biofilms on PVDF membranes after chemical cleaning by sodium hypochlorite," (2015) Separation and Purification Technology, 141, 314321.
Ricci et al., "Integration of nanofiltration and reverse osmosis for metal separation and sulphuric acid recovery from gold mining effluent," (2015) Sep. Purif. Technol. 154 1121.
Chang et al., "Effect of polar rotation on the formation of porous poly(vinylidene fluoride) membranes by immersion precipitation in an alcohol bath," (2016) J. Memb. Sci., 513, 186196.
Chen et al., "Highly stable polysulfone solvent resistant nanofiltration membranes with internal cross-linking networks," (2016) RSC Advances 6, 29570-29575.
Koh et al., "Reverse osmosis molecular differentiation of organic liquids using carbon molecular sieve membranes," (2016) Science 353, 804807.
Marbelia et al., "Polyacrylonitrile membranes for microalgae filtration: Influence of porosity, surface charge and microalgae species on membrane fouling," (2016) Algal Res. 19, 128137.
Paul, et al., "Chemistry and fabrication of polymeric nanofiltration membranes: A review," (2016) Polymer, Science Direct, 103, 417456.
Van Goethem et al., "Controlled positioning of MOFs in interfacially polymerized thin-film nanocomposites," (2016) J. Mater Chem. A. 4, 1636816376.
Aguiar et al., "Acid mine drainage treatment by nanofiltration: A study of membrane fouling, chemical cleaning, and membrane ageing," (2017) Separation and Purification Technology, 192, 185195.
Lee et al., "interfacial polymerization of cyanuric chloride and monomeric amines: pH resistant thin film composite polyamine nanofiltration membranes," (2017) Journal of Membrane Science, 523, 487496.
Li et al., "Highly stable PDMS-PTFPMS/PVDF OSN membranes for hexane recovery during vegetable oil production," (2017) RSC Advances, 11381-11388.
Verbeke et al., "Chlorine-resistance of reverse osmosis (RO) polyamide membranes," (2017) Prog. Polym. Sci. 72, 115.
Wan et al., "Multiscale-structuring of polyvinylidene fluoride for energy harvesting: the impact of molecular-, micro- and macro-structure," (2017) J. Mater. Chem. A, 5, 30913128.
Mertens, et al., "Development of a polyvinylidene difluoride membrane for nanofiltration," (2018) J. Membrane Sci., 557, 24-29.
International Search Report and Written Opinion dated Jan. 25, 2019 in related International Application No. PCT/EP2019/051867.

\* cited by examiner

CROSS-LINKED NANOFILTRATION MEMBRANES

Membranes are used in separation processes as selective barriers that allow certain components to pass, i.e., the permeate, while retaining other compounds, i.e., the retentate. Selectivity is based on differences in size, charge, and/or affinity between the components and the membrane. Membrane separation processes are an increasingly important field in the art of separation science. They can be applied in the separation of a range of components of varying molecular weights in gas or liquid phases, including but not limited to nanofiltration (NF), desalination and water treatment (Mulder, M. Basic Principles of Membrane Technology, Second Edition. Dordrecht, Kluwer Academic Publishers, 1996. 564p). The main advantage of membrane technology is its environmentally friendly character, since it uses much less energy than most conventional separation technologies, like e.g. distillation, and causes less waste streams than e.g. extraction.

Membrane separation processes are widely applied in the filtration of aqueous fluids (e.g. desalination and wastewater treatment). However, they have not been widely applied for the separation of solutes in extreme conditions, despite the fact that filtrations in extreme conditions, such as solvents (organic solvent nanofiltration, OSN or solvent resistant nanofiltration, SRNF) or extreme pH, have many potential applications in industry. This is mainly due to the relatively poor performance and/or stability of the membranes in these conditions.

Currently, halopolymers such as e.g. poly(tetrafluoroethylene), are amongst the most commonly used hydrophobic membrane materials. While many of these polymers have successfully been formed into microporous membranes, the search continues for membrane materials with tighter MWCO and stability in solvents and other extreme conditions.

Koh et al. (2016) *Science* 353, 804-807 rendered a PVDF-based support membrane thermostable by cross-linking it using a one-pot dehydrofluorination and para-xylenediamine based cross-linking reaction. The membrane acts as a thermostable support for a carbonized selective layer.

Membrane-based technologies are often preferred for wastewater treatment because of their energy efficiency, easy scalability and operation without the use of any hazardous chemicals. Nanofiltration (NF) in particular is useful for the purification of various streams (e.g. from diary or food industry) because of its ability to separate small molecular weight solutes (MW 200-1000 Da) from their solvent [Van Goethem et al. (2016) 1. *Mater. Chem. A.* 4, 16368-16376; Marchetti et al. (2014) *Chem. Rev.* 114, 10735-10806; Vandezande et al. (2008) *Chem. Soc. Rev.* 37, 365-405]. However, membrane-based separation processes are often prone to fouling which results in a decreased flux and associated increased energy consumption [Marbelia et al. (2016) *Algal Res.* 19, 128-137; Le-Clech et al. (2006) *J. Memb. Sci.* 284, 17-53].

Whereas physical strategies (e.g. relaxation or backwashing) are effective at remediating some of the effects of fouling on short term, regular chemical cleaning is often still required to recover as much membrane performance as possible [Piasecka et al. (2015) *Sep. Purif. Technol.* 141, 314-321]. Chemical cleaning involves the use of reactive compounds to degrade and subsequently remove the adsorbed foulant layer [Vanysacker et al. (2014) *J. Memb. Sci.* 457, 19-28; Jeison & Lier (2007) *Sep. Purif. Technol.* 56, 71-78]. However, these compounds often also (partially) degrade the membrane material and separation performance. Polyamide (PA) thin-film composite (TFC) NF membranes, commonly used in NF and RO, for instance are known to be very sensitive to the common cleaning agent sodium hypochlorite because of the easily susceptible amide bonds. These bonds can undergo chlorination which in the end often leads to premature module replacement [Verbeke et al. (2017) *Prog. Polym. Sci.* 72, 1-15]. Many membrane materials also fail in other extreme conditions, such as at extreme pH or in harsh solvents [Valtcheva et al. (2014) *J. Memb. Sci.* 457, 62-72]. Examples of such extreme pH conditions include pulp and paper or mining effluent treatment [Beril Gönder et al. (2011) *Sep. Purif. Technol.* 76, 292-302; Ricci et al. (2015) *Sep. Purif. Technol.* 154 11-21; Aguiar et al. (2017) *Sep. Purif. Technol.* 192, 185-195], and separation of hemicellulose from concentrated alkaline process liquors [Schlesinger et al. (2006) *Desalination.* 192, 303-314]. Therefore, novel membranes prepared from different polymers, such as e.g. polybenzimidazole or sulfonated poly (ether ketone), are being investigated as well as the development of alternative polymer chemistries for interfacial polymerization e.g. based on polyamine formation through the use of cyanuric chloride instead of the more common PA that is obtained when using trimesoylchloride [Paul & Jons (2016) *Polymer (Guildf)*. 103, 417-456; Dalwani (2011) *J. Memb. Sci.* 381, 81-89; Lee et al. (2015) *J. Memb. Sci.* 478, 75-84; Lee et al. (2017) *J. Memb. Sci.* 523, 487-496].

There remains a need for membranes which can be used in nanofiltration applications under harsh conditions such as extreme pH values and or organic solvents

SUMMARY OF THE INVENTION

The present invention discloses the use of cross-linked membranes which be used in nanofiltration at extreme pH and/or in liquids comprising organic solvents. Apart from filtration itself in these conditions, such condition can be equally applied to clean a membrane.

The membranes as described in the invention can be used without additional pyrolysis to further modify the filtration properties of the membrane.

The membranes can be used in industrial application wherein small compounds are to be separated from strongly alkaline or acidic solutions or from organic solvents.

Possible applications include waste water treatment in mining industry, resistance to harsh cleaning procedures e.g. in dairy industry, recovery of APIs, streams that have an extreme pH and also contain solvents from e.g. pharmaceutical industry, etc.

In the preparation of membranes, typically, loose poly (vinylidene difluoride) nanofiltration membranes were cross-linked using a one-pot reaction with para-xylenediamine in alkaline conditions. The cross-linking reaction was characterized using ATR-FTIR and EDX-based elemental analysis as function of reaction time. Upon cross-linking, the retention of the membranes improved dramatically for test compounds Rose Bengal (from 90 to 100%) and MO (methyl orange) (from 49 to 91%) without significant loss of permeability. The physico-chemical changes of the membrane during the cross-linking reaction were further characterized through XRD, TGA, DSC and DMA. Cross-linking resulted in a strong decrease in crystallinity of the semi-crystalline PVDF as well as a decrease in tensile strength and thermal stability. 24 h cross-linked PVDF membranes were tested for NF application under extreme pH conditions. The membranes were found to be suitable for both acidic and caustic conditions but the effect was different. Acidic conditions resulted in a dramatic increase in permeance accompanied with a small loss of retention (<4% for RB). Caustic conditions on the other hand showed a 25% decrease in permeance and small increase in retention. This proves that cross-linking is a suitable strategy to improve the stability of PVDF, especially in alkaline conditions where pristine PVDF is not applicable at all.

The invention is exemplified with a one-pot cross-linking strategy to densify the membrane selective layer and thus improve the retention. This reaction, which was reported previously to render PVDF support membranes stable under carbonization conditions, consists of two steps (see FIG. 1) occurring simultaneous in one-pot [Koh et al. (2016) *Science* 353, 804-807]. (i) Using strongly alkaline conditions combined with an acid acceptor (e.g. MgO), PVDF can be dehydrofluorinated resulting in the formation of C=C double bonds. (ii) These double bonds are then transformed to secondary amines through the para-xylenediamine (XDA) cross-linker, resulting in the formation of a secondary amine on the PVDF main chain [Taguet et al. in: Crosslinking in Materials Science Technical Applications Springer, Berlin, Heidelberg, 2005: pp. 127-211]. PVDF membranes were cross-linked for various times. The effect of cross-linking on the membrane performance was characterized via dead-end filtration experiments using a small and a large dye as test solutes and the physicochemical changes of the membranes were characterized via DMA, DSC, FTIR, TGA and XRD. The optimized cross-linked membrane was tested for NF application in extreme pH conditions.

Cross-linking of selective halopolymer membranes using a (potentially one-pot) tandem dehydrofluorination and cross-linking reaction leads to the formation of membranes stable and applicable in virtually any feed stream. In combination with the well understood techniques for tuning MWCO in the state of the art, membranes can be fine-tuned towards the desired MWCO.

Membranes as used in the present invention have the advantage in that they are uncoated and that the selectivity can be obtained as such without the need for a coating. This is contract to e.g. W2010082194 and EP0574957 which discloses PAN or PVDF-based crosslinked membranes.

Similarly Li et al. (2017) RSC Advances 11381-11388 discloses PDMS/PTFPMS-coated uncrosslinked PVDF membranes. Herein, the PVDF merely functions as a mechanical support layer and does not contribute to the selectivity of the membrane. The selectivity of the membrane originates from the coated PDMS/PTFPMS layer. In addition, the PVDF layer is not crosslinked and thus lacks stability. In contrast therewith uncoated crosslinked selective membranes have the advantage of being selective without requiring the coating of a selective layer and are stable in a wide variety of solvents and at extreme pH conditions.

Membranes as used in the present invention are stable in extreme pH conditions. This in contrast to e.g. Chen et al. (2016) *RSC Advances* 6, 29570-29575 which disclose cross-linked chloromethylated polyethersulfone based membranes. Such membranes are not vinyl-based membrane according to the present invention. Such prior membranes comprise ether bonds which are not sufficiently stable in extreme pH conditions.

The invention is further summarized in the following statements:
1. Use of a cross-linked non-pyrolysed selective halopolymer-membrane in the filtration of compounds from liquids comprising organic solvents and/or from liquids with a pH below 2 or above 12.
2. The use according to statement 1, wherein the membrane has a mwco of between 100 and 1000 Da.
3. The use according to statement 1 or 2, wherein the membrane is a cross-linked PVDF membrane.
4. The use according to any one of statements 1 to 3, wherein the membrane has an average pore size smaller than 0.1 µm.
5. The use according to any one of statements 1 to 4, wherein the membrane has a thickness between 40 and 600 µm.
6. The use according to any one of statements 1 to 5, which further includes the use of cleaning said membranes at a pH below 2, or above 12.
7. The use according to any one of statements 1 to 6, at a pH below 0, or above 14.
8. The use according to any one of statements 1 to 7, at a temperature up to 120° C.
9. The use according to any one of statements 1 to 8, wherein the solvent is a polar an apolar, a protic or aprotic solvent.
10. The use according to any one of statements 1 to 9, wherein the solvents is a solvent that results in swelling or dissolution of the corresponding uncross-linked membrane.
11. The use according to any one of statements 1 to 10, wherein the cross-linked polymer is obtained by dehydrohalogenation in alkaline media and cross linking.
12. The use according to statement 11, wherein the cross linking is performed with a diamine.
13. The use according to any one of statements 1 to 12, for the filtration of recovery of heavy metal ions from alkaline or acidic mining waste or cleaning agents in dairy industry.
14. Use of an uncoated cross-linked non-pyrolysed selective vinyl based halopolymer-membrane with a mwco of between 100 and 1000 Da, in the filtration of compounds from liquids comprising organic solvents and/or from liquids with a pH below 2 or above 12.
15. The use according to statement 14, in the filtration of compounds from a liquid comprising organic solvents.
16. The use according to statement 14, in the filtration of compounds from a liquid without organic solvents.
17. The use according to any of statements 14 to 16, wherein the liquid has a pH above 12.
18. The use according to any of statements 14 to 17, wherein the liquid has a pH below 2.
19. The use according to any one of statements 14 to 18, wherein the membrane is a cross-linked PVDF membrane.
20. The use according to any one of statements 14 to 19, wherein the membrane is solvent activated cross-linked PVDF membrane. Suitable solvents for activation are for example alcohols such as ethanol.
21. The use according to any one of statements 14 to 20, wherein the membrane has been dried prior to the use.
22. The use according to any one of statements 14 to 21, wherein the membrane has an average pore size smaller than 0.1 µm.
23. The use according to any one of statements 14 to 22, wherein the membrane has a thickness between 10 to 600 µm or 40 and 600 µm.
24. The use according to any one of statements 14 to 23, which further includes the use of cleaning said membranes at a pH below 2, or above 12.
25. The use according to any one of statements 14 to 24, at a pH below 0, or above 14.
26. The use according to any one of statements 14 to 25, at a temperature up to 120° C. or up to 150° C.
27. The use according to any one of statements 14 to 26, wherein the solvent is a polar an apolar, a protic or aprotic solvent.

28. The use according to any one of statements 14 to 27, wherein the solvent is a solvent that results in swelling or dissolution of the corresponding uncross-linked membrane.
29. The use according to any one of statements 14 to 28, wherein the cross-linked polymer is obtained by dehydrohalogenation in alkaline media and cross linking.
30. The use according to statement 29, wherein the cross linking is performed with a diamine.
31. The use according to any one of statements 14 to 30, for the filtration of recovery of heavy metal ions from alkaline or acidic mining waste or cleaning agents in dairy industry.
32. A method of removing a compound from a liquid comprising an organic solvent and/or from a liquid with a pH below 2 or above 12, comprising the step of applying said liquid on an uncoated cross-linked non-pyrolysed selective vinyl based halopolymer-membrane with a mwco of between 100 and 1000 Da, and optionally applying a pressure on the liquid to pass the liquid through the membrane.

DETAILED DESCRIPTION

Figure Legends

FIG. 1. Schematic representation of a dehydrofluorination and diamine-based cross-linking reaction of PVDF The halopolymer is exemplified by PVDF and the cross-linker by para-xylenediamine.

Figure 2:
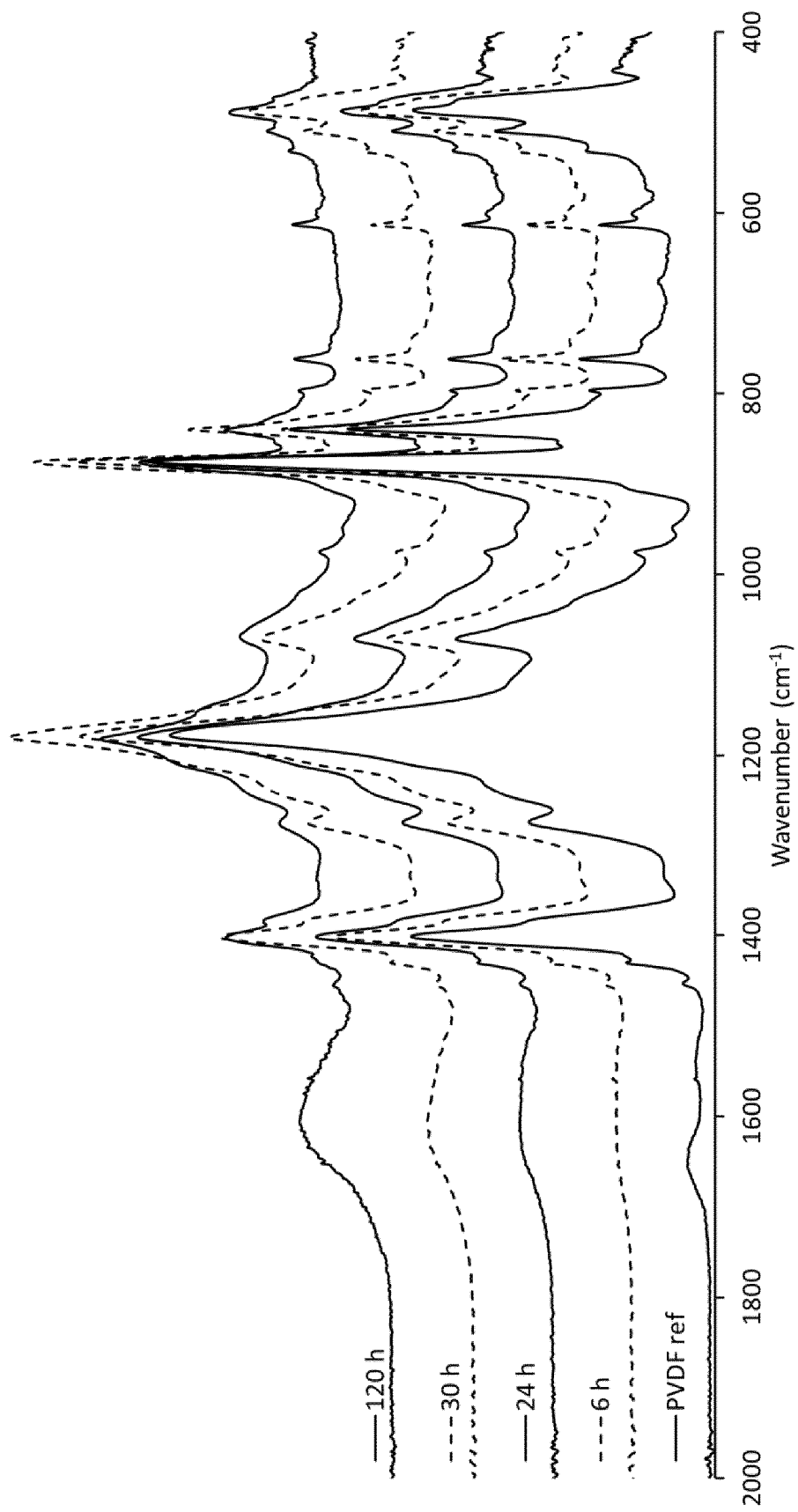

FIG. 2. ATR-FTIR spectra of the PVDF membranes as function of cross-linking time.

Figure 3:
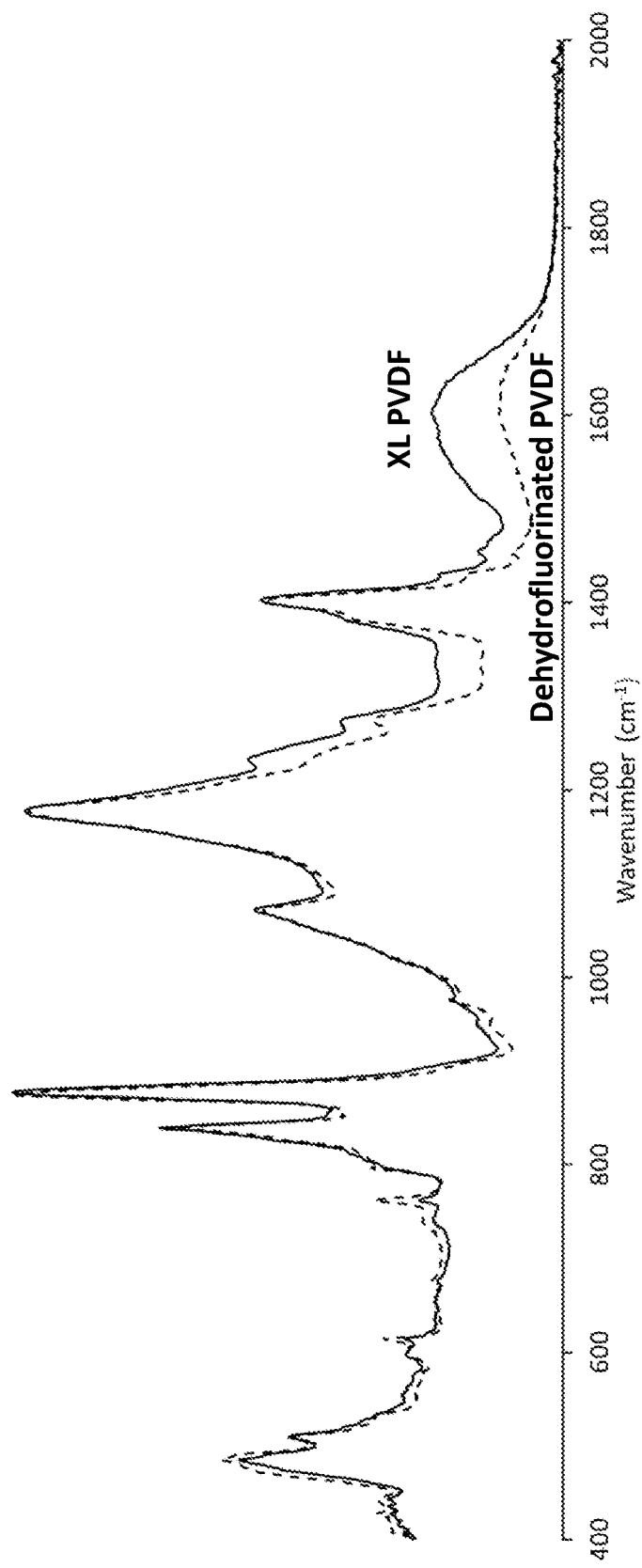

FIG. 3. ATR-FTIR comparison of 120 h cross-linked PVDF and dehydrofluorinated PVDF.

Figure 4:
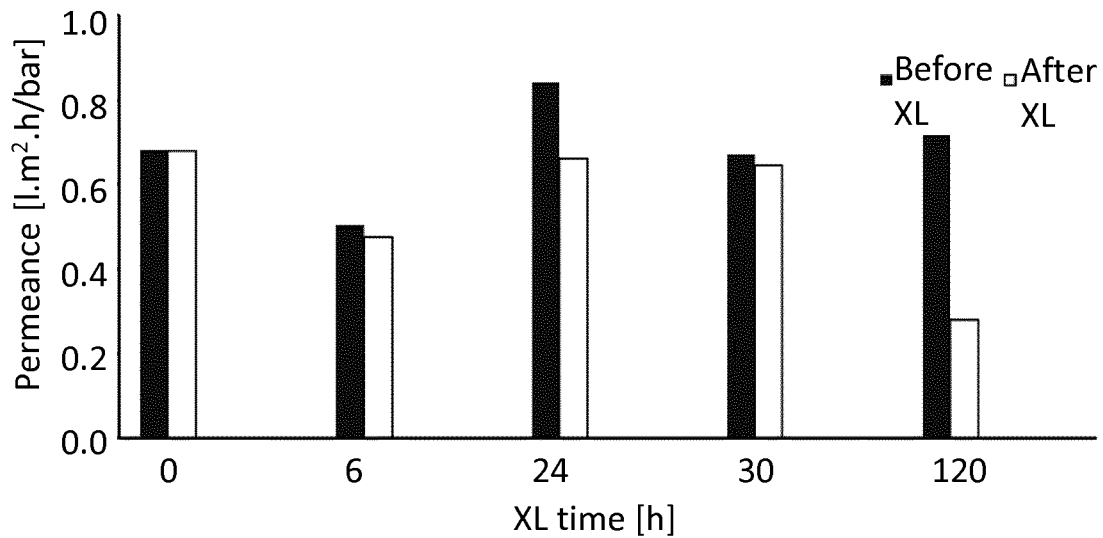

FIG. 4. Pure water permeance before (■) and after (*) cross-linking for various cross-linking times.

Figure 5:
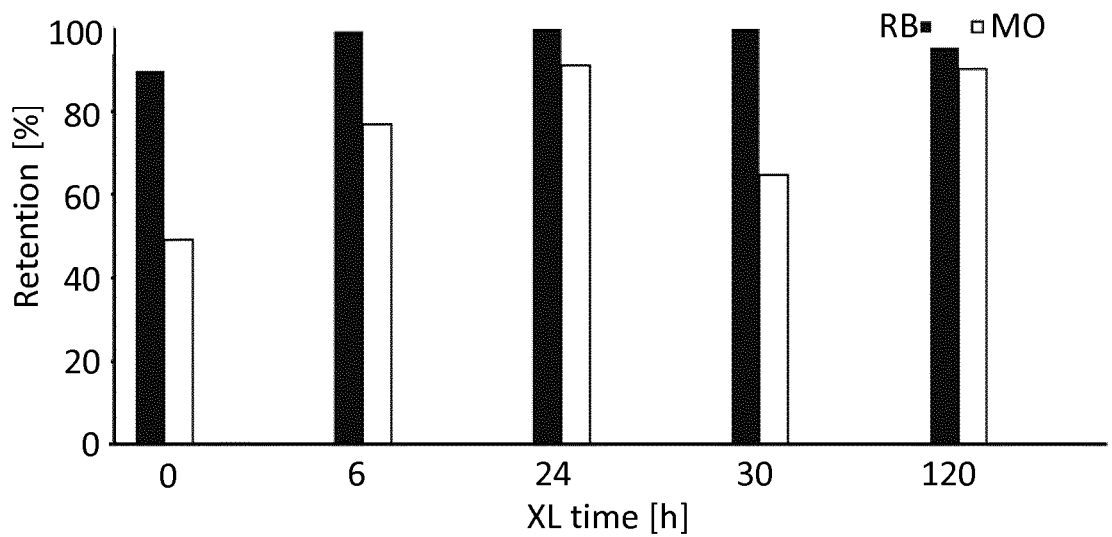

FIG. 5. Effect of cross-linking on the membrane retention for RB (1017 Da) and MO (327 Da).

Figure 6:
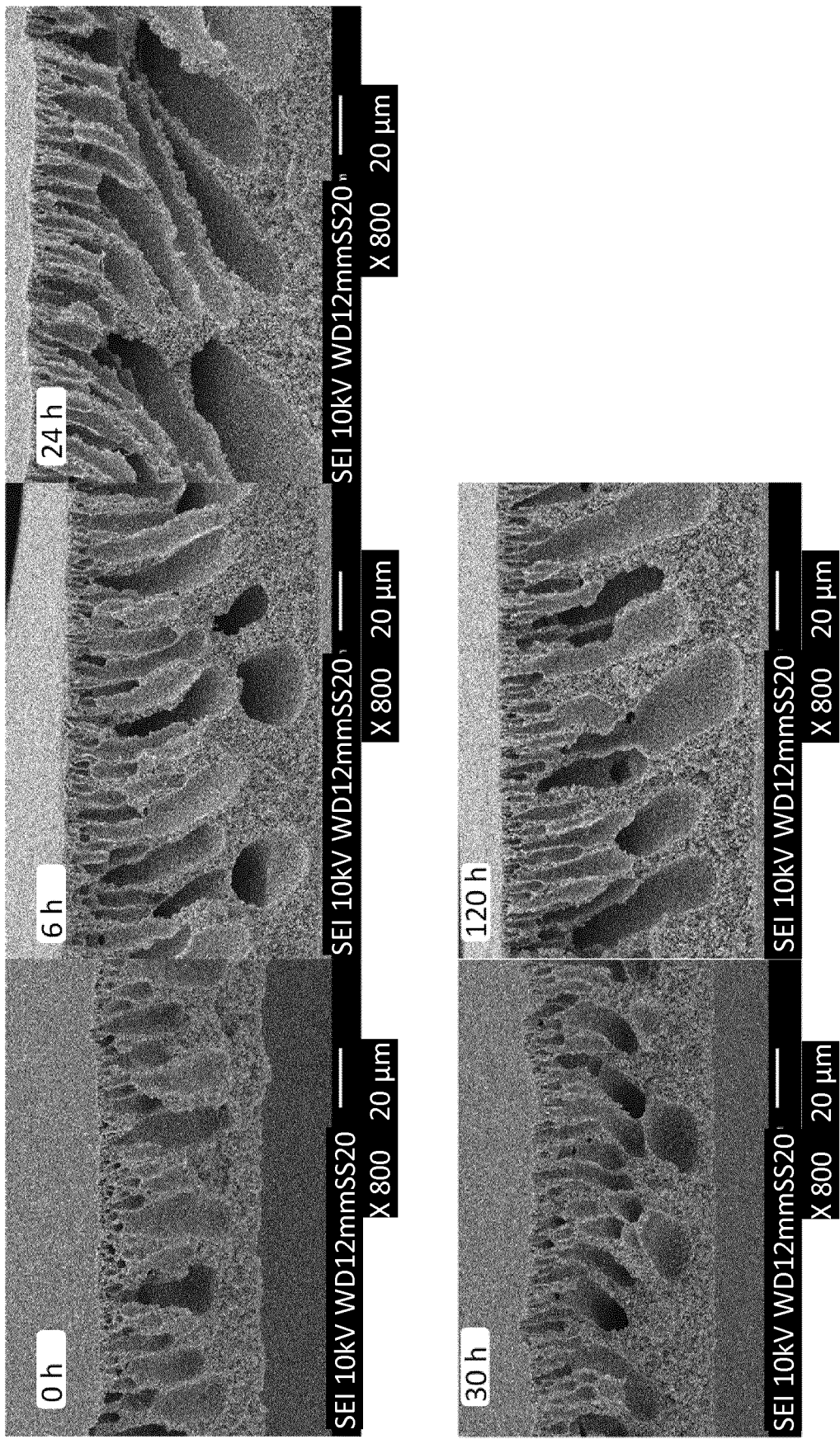

FIG. 6. SEM cross-section images as function of the membrane cross-linking time (indicated on the image).

Figure 7:
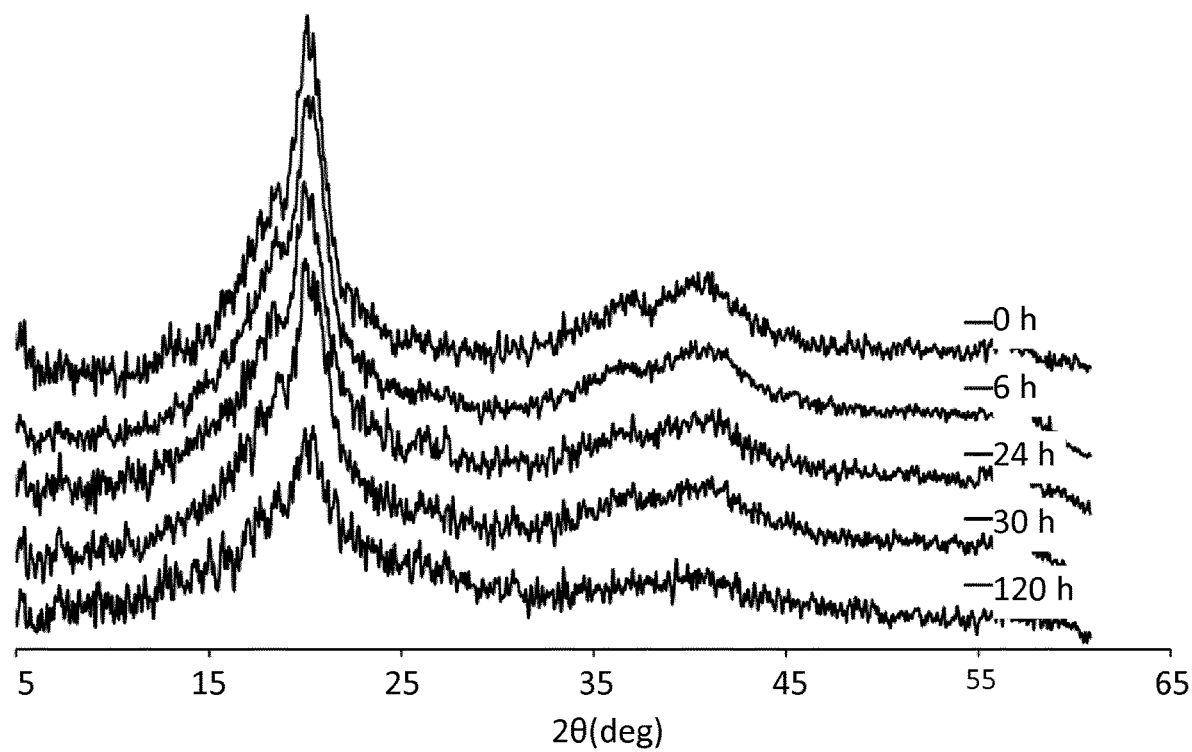

FIG. 7. XRD patterns of the cross-linked PVDF membranes as function of cross-linking time.

Figure 8:
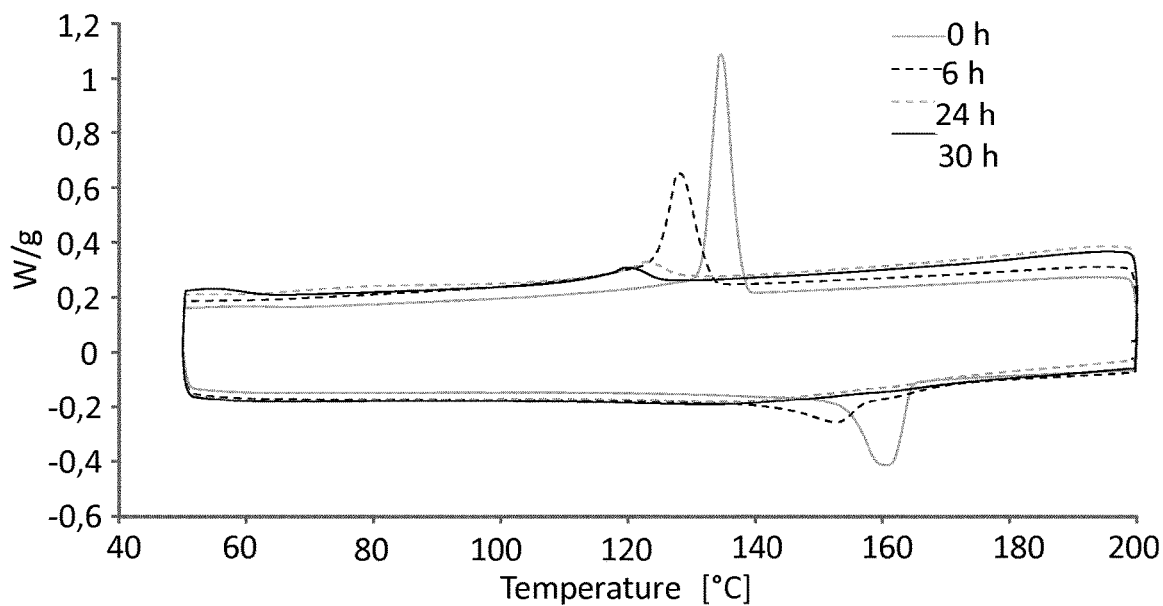

FIG. 8. DSC profiles of the cross-linked PVDF membranes as function of cross-linking time. The 120 h cross-linked sample was not measured because of limited thermal stability in the higher end of the temperature window used for DSC measurements.

Figure 9:
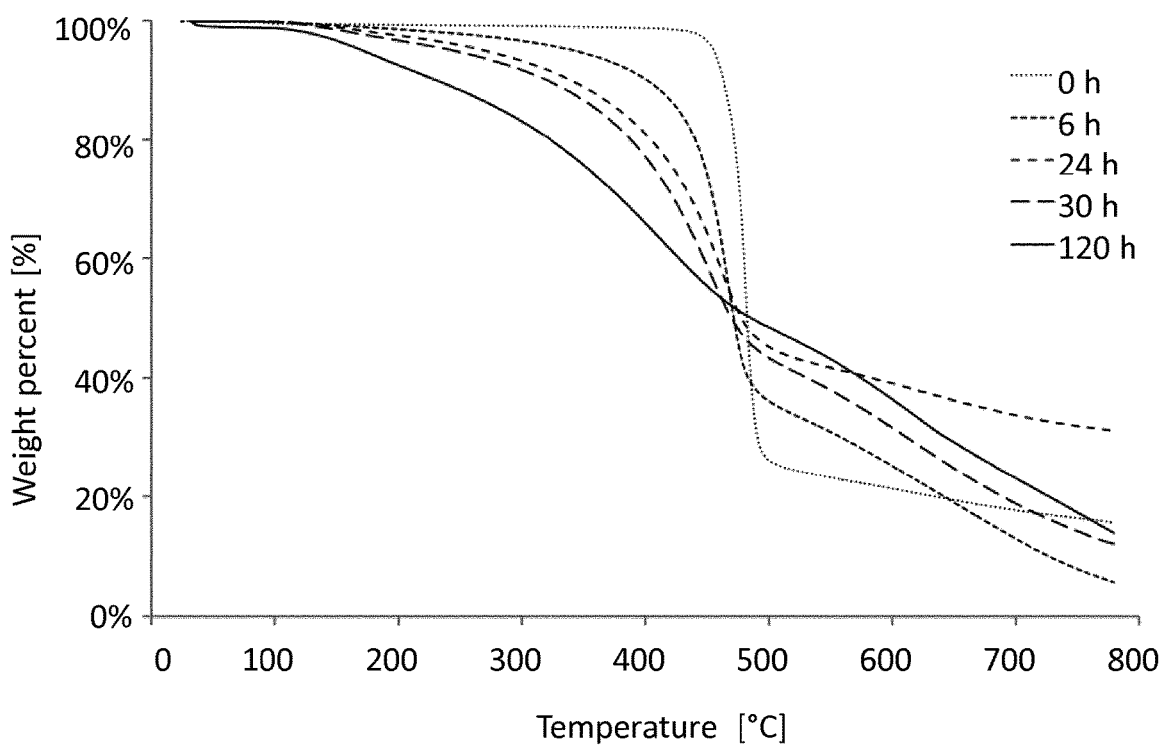

FIG. 9. TGA of the PVDF membranes in weight % as function of cross-linking time.

Figure 10:
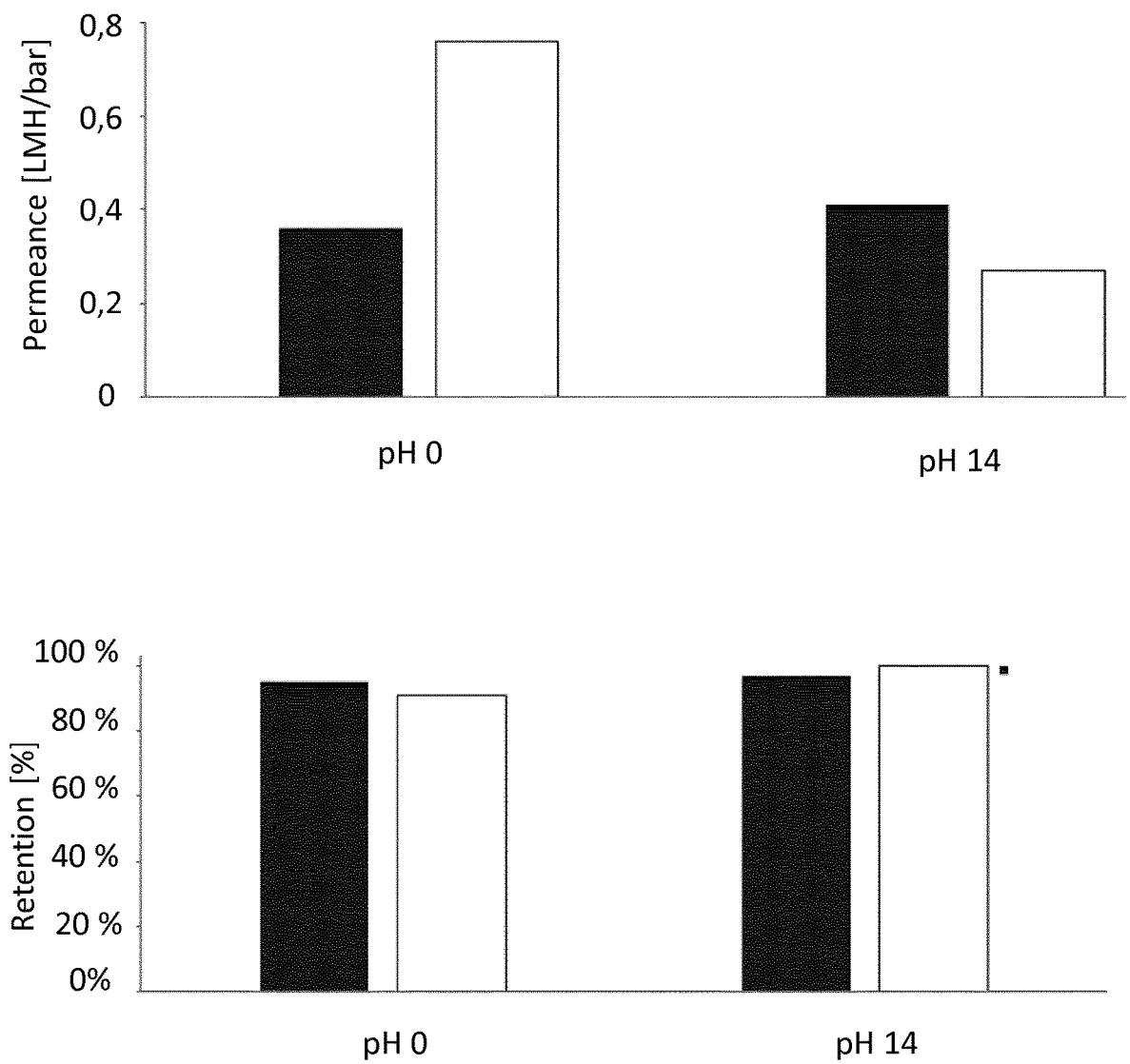

FIG. 10. $H_2O$ permeance (left panel) and RB retention (right panel) before (■) and after (*) treatment in acidic and caustic conditions.

Figure 11:
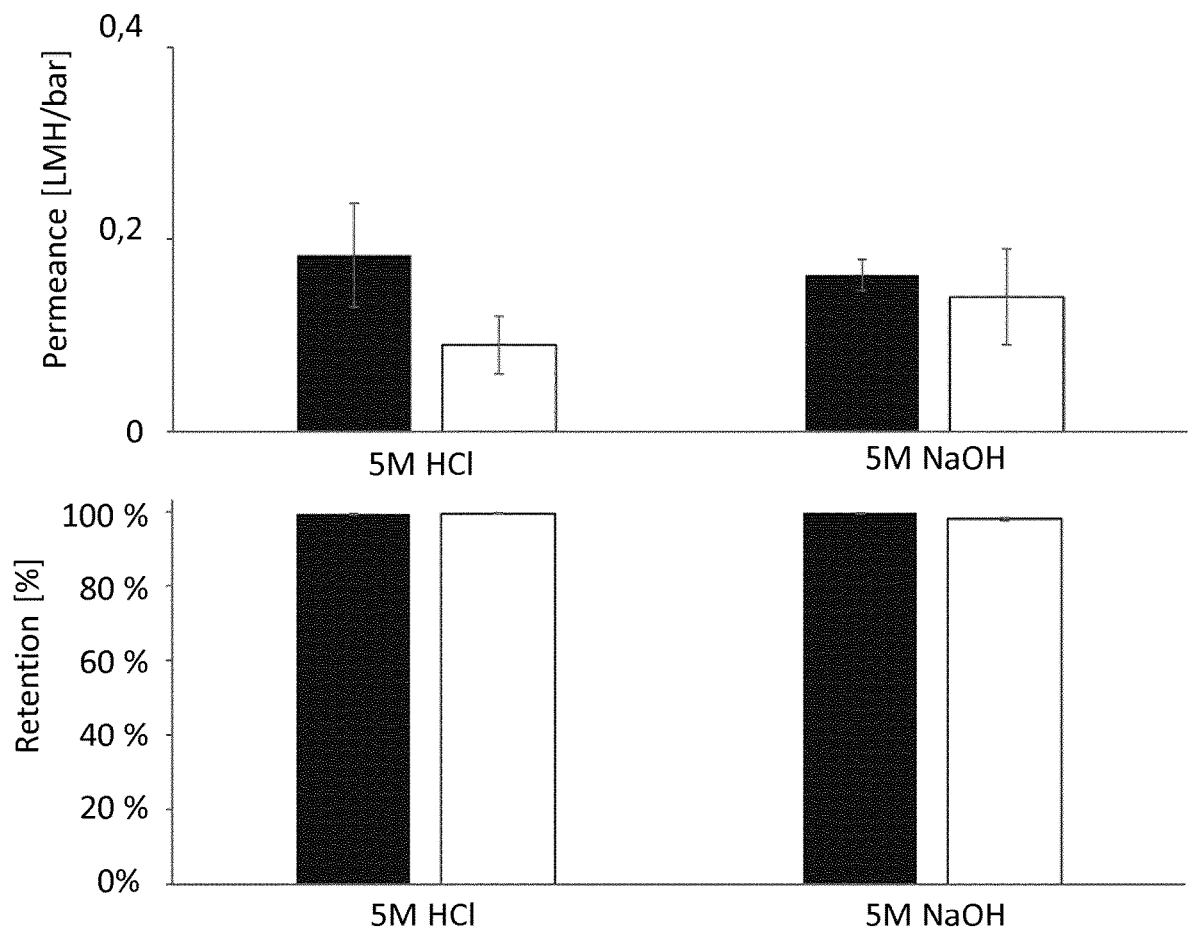

FIG. 11. $H_2O$ permeance (top panel) and RB retention (bottom panel) before (■) and after (*) treatment in acidic (5M HCl) and caustic (5M NaOH) conditions.

Figure 12:
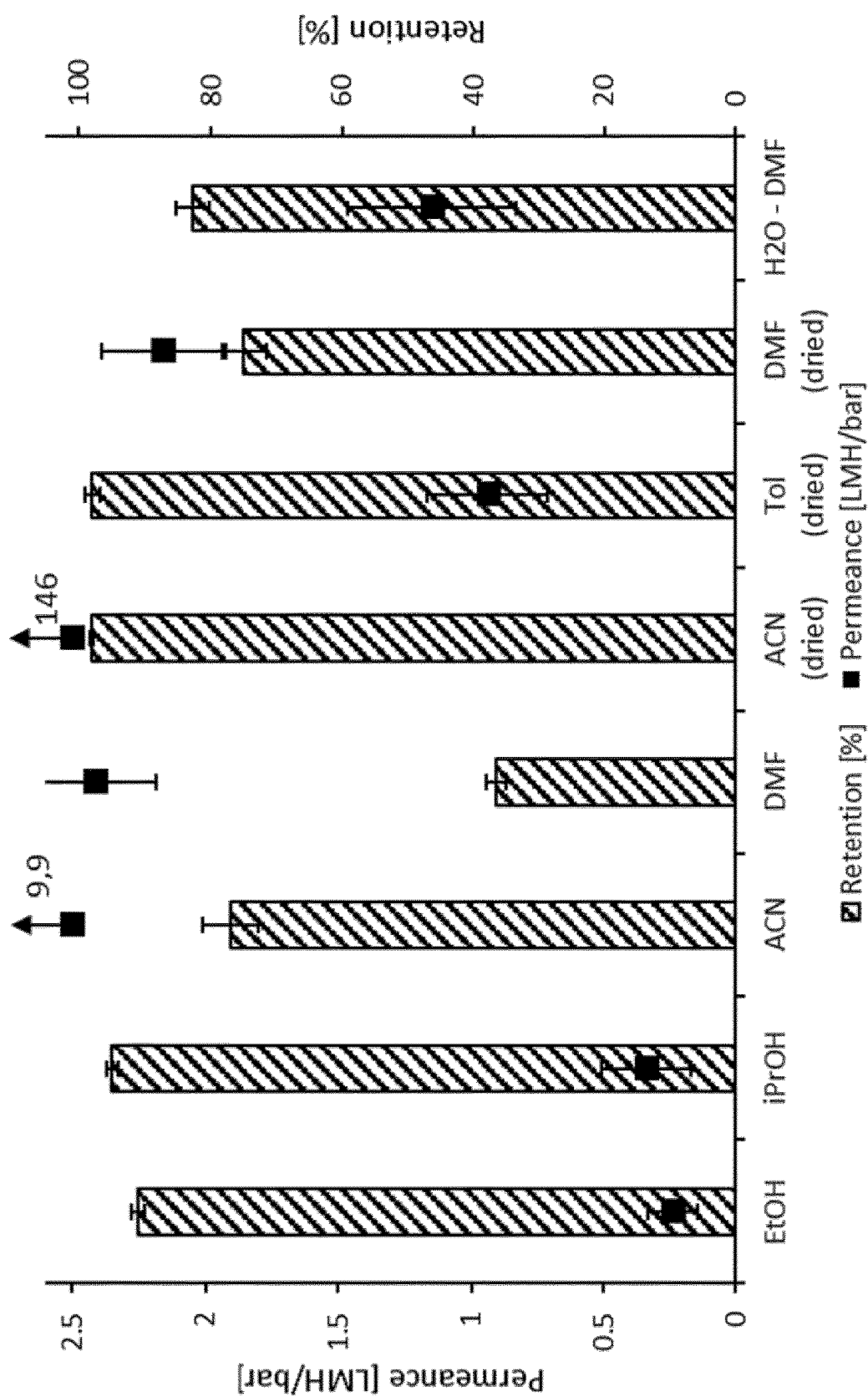

FIG. 12. $H_2O$ permeance and RB retention in different organic solvents (with and without drying step.

ABBREVIATIONS

PVDF, poly(vinylydene difluoride); NF, nanofiltration; SEM, scanning electron microscopy; XRD, X-ray diffraction spectroscopy; DSC, differential scanning calorimetry; TGA, thermal gravimetric analysis; DMA, dynamic mechanical analysis; RB, Rose Bengal; MO, methyl orange; MWCO, molecular weight cut-off; EDX, energy-dispersive X-ray spectroscopy; HCl, Hydrochloric acid; DMF, dimethylformamide; MeOH, methanol; XDA, p-xylenediamine; NaOH, sodium hydroxide.

The invention relates to cross-linked halopolymer membraned used in nanofiltration processes, i.e. membranes with typically an average pore size between 1 and 10 nanometers. The membranes generally have the capacity to isolate compounds with a Mw of 200-1000 Da from a solvent.

"Vinyl-based" in this context refers either to a polymer where at least 2 carbon-carbon double bonds, other than aromatic groups, are present in the polymer main chain or side chain. An example thereof is vinyl-substituted polynorbornene. Alternatively, it refers to a polymer where at least 2 carbon-carbon double bonds, other than aromatic groups, can be created in either the polymer main chain or side chain. Examples thereof include polyvinylidene fluoride (PVDF), polyvinylchloride (PVC) or poly(vinylidene fluoride-co-hexafluoropropylene).

The cross-linking process as described in the examples PVDF involves a defluorination step. Other fluor-containing polymers or polymers containing halogen groups in general are applicable in the methods and uses of the present invention.

Examples of halopolymers are e.g. PVC, ethylene/tetrafluoroethylene copolymers, PTFE, PFA, poly(vinyl bromide).

In a typical embodiment of the present invention the fluoropolymer is PVDF. Unmodified PVDF is a semi-crystalline polymer containing a crystalline phase and an amorphous phase. The crystalline phase provides good thermal stability whilst the amorphous phase adds some flexibility to the membrane. PVDF exhibits a number of desirable characteristics for membrane applications, including thermal resistance, reasonable chemical resistance (to a range of corrosive chemicals, including sodium hypochlorite), and weather (UV) resistance.

The cross-linking of the membrane according to the methods disclosed herein provide a membrane with even more robust properties (pH stability and solvent resistance).

Non-cross-linked halopolymer membranes can be obtained via any membrane formation processes such as phase inversion (flat sheet or hollow fiber), stretching or template leaching. The membrane characteristics (such as permeance, MWCO, structure) can be fine-tuned through adjusting the membrane formation parameters. In phase inversion, such parameters include but are not limited to polymer concentration, solvent type, addition/type/concentration of co-solvent, evaporation step, casting thickness, supporting fabric layer, the addition of additives.

The cross-linking of halopolymers such as PVDF can be accomplished in multiple ways, as summarized by Taguet et al. (2005). In short, diamines, bisphenols, peroxides (but not for PVDF) and radiation (e.g. electron beams) are described for the cross-linking of various halopolymers. Other methods involve the grafting of a polystyrene network on a defluorised polymer.

Other approaches for cross-linking a halopolymer-containing membrane can be found in the state of the art. CN102924732 describes the preparation of a cross-linked PVDF-HFP modified membrane using benzylperoxide and hot pressing cross-linking. WO2006073867 describes the preparation of a coating formulation combining a halopolymer latex dispersion with inorganic oxide nanoparticles in alkaline cross-linking conditions using a cross-linker comprised of either at least two amine functionalities or at least one amine group with at least one alkoxy silane. WO2010/082194 discloses commercial membranes made of various polymers, such as polysulphone (PS), polyether sulphone (PES), PAN, PVDF, which are cross-linked with polyethylene imine (PEI) using different chemistries.

WO2006135966 describes the preparation of a porous polymeric membrane from a polymer blend which contains a hydrophobic non-cross-linkable component (e.g. PVDF) and a component which is cross-linkable (for instance, PVP) and treating this porous polymeric membrane under cross-linking conditions to produce a modified more hydrophilic membrane. CN102151498 describes the cross-linking of PVDF/PU blend membranes using a nano-sol based cross-linker comprised of an inorganic precursor, coupling agents, diluents and nanoparticles. WO1996003202 A1 described the use of UV-irradiation and thermal treatment to render various polymeric support membranes solvent stable. U.S. Pat. No. 8,552,623 described a diamine-based thermal cross-linking of PVDF to form polymer actuators.

In a typical embodiment this is performed using PVDF by a defluorination in alkali, followed by a nucleophilic attack.

Herein anything remaining in the pores of the membranes from the membrane formation process or potential storing conditions is removed and exchanged for the cross-linking solvent. This cross-linking solvent is a typically weak swelling agent for the halopolymer to provide sufficient matrix penetration for the cross-linking. The cross-linking solvent can be changed to control the cross-linking reaction. Next double bonds are created, in the halopolymer-based membranes through a dehydrofluorination reaction. This reaction is performed in alkaline conditions which can be created through the addition of various alkaline reagents (e.g. NaOH, KOH, or NaH) to the cross-linking solvent. The degree of dehydrofluorination can be adjusted by adjusting the parameters (time, temperature, type of base, addition of a catalyst) and can be between 0.00001 and 100%. The dehydrofluorination reaction may be enhanced by the addition of any acid acceptor (such as MgO or CaO). The second phase of the reaction converts part (0%<degree of conversion >100%) of the double bonds to cross-links through the addition of a nucleophilic cross-linker. The active functional group of this cross-linker can include amines, alcohols and thiols. This cross-linking reaction may be tuned by the addition of a catalyst, temperature, or reagent concentrations. The above described dehydrofluorination and cross-linking reaction can occur simultaneously in a one-pot reaction or in two consecutive steps. An example of the reaction scheme is shown for PVDF and XDA as cross-linker in FIG. 1.

The resulting cross-linked membranes are further treated in a washing protocol to remove the unreacted substances present in the pores of the membranes and neutralize the pH which should stop the reaction. Chemicals used in the washing step can include HCl and MeOH.

After cross-linking, the membranes can be directly used in a filtration setup, formed into membrane modules (e.g. spiral wound module) or stored for an unlimited time. The membranes can be stored dry or wet and may involve the use of chemicals (e.g. to preserve the pore structure or to prevent microbial growth).

The final membranes can be used in aqueous, solvent, any pH condition or any combination thereof. The membranes can easily be cleaned because of their chemical stability, if necessary.

The present invention provides selective and cross-linked halopolymer-based membranes. The halopolymer membranes can be formed through various membrane forming techniques present in the state of the art, such as phase inversion (flat sheet or hollow fibre), stretching or template leaching. The uncross-linked membranes are then subjected to a (one- or two-step) cross-linking reaction to improve the chemical stability of the membranes.

Cross-linked halopolymer as described above can be further modified using the native and/or introduced chemical functionality. Examples include creating charge via quaternization of the secondary amines introduced when cross-linking with a diamine which can increase the rejection for charged compounds and which also renders them useful for battery and fuel cell applications.

EXAMPLES

Example 1. Preparation of Cross-Linked PVDF Membranes Materials

Commercially available PVDF powder was purchased from Sigma Aldrich (MW 543 kDa, Belgium) and dissolved in N-methylpyrrolidon (NMP) and tetrahydrofuran (THF) purchased from Honeywell and Acros Organics (Belgium) respectively. Magnesium oxide (MgO), methanol (MeOH), sodium hydroxide (NaOH) where acquired from Sigma-Aldrich and para-xylenediamine (XDA) from TCI Chemicals (Belgium). Rose Bengal (RB, MW 1017, Sigma-Aldrich) or Methyl Orange (MO, MW 327, Fluka) were dissolved in miliQ water.

Membrane Preparation

Loose PVDF-based NF membranes were prepared as described in [Mertens, (2018) *J. Membrane Sci.* 557, 24-29]. In brief, 20 wt % of PVDF was added to a 90:10 weight ratio NMP:THF solvent mixture. The solution was stirred at room temperature until homogeneous and left for 12 h to degas before the membrane casting. Membranes were cast on a glass plate using a Braive instruments automatic film applicator using a casting speed of 2.25 m/s and a casting thickness of 250 μm. After a short evaporation step of 5 s, the membrane was transferred to a deionized water containing coagulation bath. The membranes were stored in deionized water until further use.

Cross-Linking

The prepared PVDF membranes were cross-linked using a one-pot reaction [Koh et al. (2016) *Science* 353, 804-807]. The water inside the pores of the membranes was first exchanged twice with MeOH before being transferred to a beaker containing the cross-linking solution. The cross-linking mixture contained 4.5 wt % of NaOH, 18.2 wt % of XDA and 9.1 wt % of MgO. The reagents were mixed vigorously with the MeOH for 10 min and sonicated subsequently for 5 min. After respectively 0, 6, 24, 30 and 120 h of cross-linking, the cross-linking was stopped by transferring the membranes to a 1M HCl solution for 2 h. The membranes were washed 3 times with MeOH (1 h) and stored in deionized water until further use.

The cross-linking solution was prepared by dissolving 4 g of para-xylenediamine, 2 g MgO and 1 g of NaOH in 15 g of MeOH. The solution was stirred to enhance the dissolution of XDA and NaOH and sonicated to ensure good dispersion of the MgO. The membranes were then immersed in the solution, the headspace above the solution was flushed with $N_2$ and the recipient was kept in complete darkness to eliminate reagent degradation. The membranes were kept in this solution for various times. Cross-linking was found to occur instantaneously with a positive correlation between cross-linking time and degree of conversion. An optimal value was found at 24 h.

This one-pot cross-linking reaction through simultaneous dehydrofluorination and cross-linking of PVDF (FIG. 2) results in the formation of a secondary amine and can thus be followed through IR spectroscopy. The IR spectra as function of cross-linking time (FIG. 3), reveal that (i) the vibration modes associated with the pristine PVDF reduce in intensity with increasing cross-linking time, and (ii) a new broad peak appears around 1600 cm−1 which increases in intensity with increasing cross-linking time. As the position of this can correspond to both the N—H scissoring of the secondary amine as to the C=C stretching from dehydrofluorinated moieties in the PVDF chain, a reference 120 h dehydrofluorinated sample was prepared and compared with the 120 h cross-linked PVDF sample (FIG. 4). As expected, the dehydrofluorinated PVDF sample shows a relatively broad peak in the same region. However, the peak of the cross-linked sample has a much higher intensity and its maximum is shifter towards lower wavenumbers. The peak around 1600 cm−1 can thus be attributed to both the dehydrofluorination and cross-linking reaction. As there is a relationship between the cross-linking time and the two observed phenomena, this shows that the degree of cross-linking increases with increasing cross-linking time.

Example 2. Filtration Experiments

Membrane performance was screened in dead-end mode using a high-throughput filtration setup containing 16 membrane positions with an active filtration area of 0.00177 m² operated at 10 bar. An aqueous solution of 35 μM RB (Rose Bengal) or MO (methyl orange) was used as feed and was stirred at 500 rpm to minimize concentration polarization. Permeate was discarded until membranes reached steady state after which at least 5 g of permeate was collected for analysis. Membrane permeance (P) was determined through equation 1 by weighing the collected permeate (with V=permeate volume, A=active membrane area, t=permeate collection time and ΔP=pressure). Retention (R) was determined using equation 2 (with Cp=solute concentration permeate and Cf=feed solute concentration). The dye concentration in feed and permeate were analyzed spectrophotometrically using a Shimadzu UV-1800 UV-VIS spectrophotometer.

$$P = \frac{V}{A \cdot t \cdot \Delta P} \quad \text{(equation 1)}$$

$$R = \left(1 - \frac{c_p}{c_f}\right) \cdot 100\% \quad \text{(equation 2)}$$

Example 3. Membrane Characterization

The chemical functionality of the membrane was analyzed through Attenuated Total Reflection infrared (ATR-FTIR) using a Bruker Alpha instrument equipped with a Germanium crystal. A total of 64 scans was collected for each sample with a resolution of 2 cm−1.

Membrane cross-section morphology was analyzed through Scanning Electron Microscopy (SEM). Cross-sections were obtained by fracturing the membranes in liquid nitrogen and fixing them on carbon tape. The samples were coated with an Au/Pd alloy using a JEOL Auto Fine Coater (JFC-1700) to minimize sample charging. Images were acquired using a JEOL JSM-6010 LV microscope operated at 10 kV. EDX Analysis was performed on a Phillips XL30-FEG microscope operated at 10 kV. A point analysis was performed at 7 different location on the membrane. The results were averaged and the elements from the coating were mathematically filtered out. X-ray diffraction patterns of the membranes were recorded on a STOE stadi P diffractometer in transmission mode using CuKα radiation (λ=1.5418 Å).

The influence of cross-linking on the membrane permeance was investigated through pure water filtrations. As can be seen from FIG. 5, there is a small variation in the membrane permeance before cross-linking (black bars), attributed to small intra-sample variations. A small decrease in permeance can be observed for all cross-linked samples but this decrease is only significant at 120 h cross-linking time. This could probably be attributed to the swelling and subsequent rearrangement and cross-linking of the PVDF chains in the MeOH-based cross-linking reaction which could result in a densified toplayer.

Example 4. Filtration Performance

The filtration characteristics after filtration with 35 μM Rose Bengal and Methyl Orange in MilliQ water for the uncross-linked and 24 h cross-linked membranes are summarized in Table 1. The elemental composition of the membranes analyzed via SEM-EDX on the topview of the membranes can be found in table 2.

TABLE 1

Filtration data using 35 μM RB in MilliQ water at 10 bar for the uncross-linked and 24 h cross-linked membrane.

| Cross-linking time (h) | Permeance [l/m² · h · bar] | Retention [%] | |
|---|---|---|---|
| | | Rose Bengal | Methyl Orange |
| 0 | 0.68 | 90 | 49 |
| 24 | 0.66 | 100 | 91 |

TABLE 2

Elemental composition determined via SEM-EDX on the membrane toplayer for the uncross-linked and 24 h cross-linked membrane.

| Cross-linking time (h) | C (%) | F (%) | N (%) |
|---|---|---|---|
| 0 | 75.62 ± 0.89 | 24.34 ± 1.11 | 0.04 ± 0.05 |
| 24 | 80.22 ± 1.61 | 18.79 ± 1.00 | 0.99 ± 0.87 |

Cross-linked PVDF-based nanofiltration membranes were prepared, as described in Example 1, with a cross-linking time of 24 h. The membranes were tested for filtration performance in EtOH, iPrOH, ACN, DMF and 80/20 H₂O/DMF. The filtration characteristics after filtration with 35 μM Rose Bengal in the respective solvents are shown in Table 3. Filtration in alcohols and H₂O/DMF do not show any sign of swelling but ACN and certainly DMF did show some influence of swelling. Swelling was completely reversible as no significant RB rejection changes were observed when performing filtration with EtOH afterwards. Optimization of cross-linking towards specific solvents can minimize impact of the swelling on the membrane performance.

TABLE 3

Filtration performance using 35 μM RB in various
solvents at 10 bar for the 24 h cross-linked membrane.

| Solvent | Permeance [l/m² · h · bar] | Retention [%] |
|---|---|---|
| EtOH | 0.10 | 91 |
| iPrOH | 0.02 | 96 |
| ACN | 9.9 | 77 |
| DMF | 2.16 | 32 |
| H₂O—DMF | 1.14 | 83 |

Example 5. Solvent Activation Effect

After filtration in the solvents mentioned in example 2, the specific coupons were re-tested for their filtration performance in EtOH. The resulting EtOH/RB filtration data can be shown in table 4. A solvent-activation effect can be observed that drastically improves membrane performance with small changes in rejection. Solvent activation can thus be used as a tool to fine-tune membrane performance.

TABLE 4

Filtration data for 35 μM RB in EtOH at 10 bar after filtrating the
coupons with different solvents showing the solvent activating effect.

| Solvent | Permeance [l/m² · h · bar] | Retention [%] |
|---|---|---|
| EtOH | 0.24 | 91 |
| EtOH after ACN | 1.85 | 95 |
| EtOH after DMF | 2.43 | 89 |

Cross-linked PVDF-based nanofiltration membranes with 24 h cross-linking time were also tested for their performance in extreme pH conditions. These conditions were simulated using HCl and NaOH solutions in MilliQ water for respectively the acidic and alkaline conditions. As can be seen from table 5, the permeance of the membranes is somewhat affected by the extreme conditions but the rejection remains the same, confirming that the separating power of the membrane which is crucial for the accomplishment of a certain separation remains unaffected by the extreme conditions.

TABLE 5

Filtration data before and after subjection to 120 h 5M
HCl and 5M NaOH for 35 μM RB in MilliQ water at 10 bar.

| | Permeance [l/m2 · h · bar] 5M HCl | Retention [%] 5M NaOH | Permeance [l/m² · h · bar] | Retention [%] |
|---|---|---|---|---|
| before | 0.18 | 99 | 0.16 | 100 |
| after | 0.09 | 99 | 0.14 | 98 |

A densification of the toplayer should also be further evidenced in the membrane retention (FIG. 6). The RB (MW=1017 Da) retention increased from 90% to 99+% for moderate cross-linking times (6-30 h) and then decreased again to 95% when using very long cross-linking times. This decrease possibly results from the easier generation of defects in the more brittle membranes that were cross-linked for long times. For the smaller MO (MW=327 Da), similar observations were made: the retention increases from 50% for the reference PVDF membrane to reach a maximum at 91% for the 24 h cross-linked sample. These observations further evidence that during the cross-linking process, the PVDF matrix is swollen which gives the polymer chains enhanced chain mobility, allowing them to be cross-linked into a denser toplayer. Although cross-linking is often used to improve the solvent resistance of polymeric membranes, cross-linking could thus also be a way to improve the separation performance.

Cross-section images acquired via SEM can be seen in FIG. 7. All membranes show the typical porous structure of membranes prepared via phase inversion containing macrovoids. Nor low nor high magnification SEM images (supplementary information) show visible indication of toplayer densification. The densification thus only seems occur at nanoscale, as could be anticipated as no significant change in permeance was observed.

Further evidence for the cross-linking reaction was provided through EDX-based elemental composition analysis. As can be seen in Table 6, the nitrogen content in the membrane, associated with the cross-linking, increases with time and the fluorine content, associated with the dehydrofluorination, decreases with time. This thus provides further evidence for a true one-pot reaction where dehydrofluorination and cross-linking occur simultaneously.

TABLE 6

Elemental composition (atom %) determined
via EDX as function of cross-linking time.

| Cross-linking time (h) | C (%) | F (%) | N (%) |
|---|---|---|---|
| 0 | 75.62 ± 0.89 | 24.34 ± 1.11 | 0.04 ± 0.05 |
| 6 | 77.59 ± 0.70 | 22.03 ± 0.93 | 0.37 ± 0.42 |
| 24 | 80.22 ± 1.61 | 18.79 ± 1.00 | 0.99 ± 0.87 |
| 30 | 81.82 ± 1.28 | 17.99 ± 1.48 | 0.19 ± 0.22 |
| 120 | 87.45 ± 1.94 | 11.39 ± 0.59 | 1.16 ± 0.76 |

Further physicochemical characterization of the membrane is required to fully understand the cross-linking process and its consequences. PVDF is a semi crystalline polymer that can be ordered in different crystal structures according to the processing of the material [Chang et al. (2016) J. Memb. Sci. 513, 186-196; Tao M (2013) Desalination 316, 137-145]. As can be seen from FIG. 8, the reference PVDF sample shows the typical peaks of predominantly the thermodynamically stable β-phase [Wan et al. (2017) J. Mater. Chem. A. 5 3091-3128; Cui et al. (2015) Prog. Polym. Sci. 51, 94-126]. With increasing cross-linking time, more and more segments of the PVDF chain are dehydrofluorinated and cross-linked which will prevent regular stacking of the polymer chains. This can be seen from the diffraction patterns as the intensity of the peaks associated with the β-phase decreases with increasing cross-linking time.

The DSC profiles (FIG. 9) provide further confirmation thereof. The reference PVDF samples shows a crystallization enthalpy of 37.7 J/g at 134.6° C. The crystallization enthalpy decreases with increasing cross-linking time to 4.9 J/g for the 120 h sample. It can also be seen that the crystallization temperature shifts towards lower temperatures pointing towards less stable crystallites in the material, which can be explained by the reduced stacking ability of chains with cross-links and/or dehydrofluorinated moieties.

Finally, also the mechanical properties of the membranes were investigated. As cross-linking converts the linear polymer chains that form the membrane into a network polymer, the membrane is expected to become more brittle. This is evidenced by the DMA results shown in Table 7. The maximum load and tensile extension at maximum load decrease with increasing contact time.

TABLE 7

Dynamic mechanical analysis result as function of membrane cross-linking time.

|  | 0 h | 6 h | 24 h | 30 h | 120 h |
|---|---|---|---|---|---|
| Maximum load (N) | 4.0 | 3.1 | 2.5 | 2.7 | 1.8 |
| Tensile extension at Maximum Load (mm) | 13.3 | 8.6 | 2.9 | 1.4 | 0.6 |
| Elongation-at-break (%) | 67 | 43 | 15 | 7 | 3 |
| Modulus (MPa) | 42.9 | 43.1 | 36.7 | 59.7 | 45.4 |

Example 6 Thermal Properties

Thermal properties of the samples were studied using a thermogravimetric analysis (TGA) Q500 and differential scanning calorimeter (DSC) Q2000 instrument from TA Instruments. The thermal degradation process was analyzed through TGA by heating approximately 5 mg of sample up to 800° C. at 10° C./min in N2 atmosphere. Thermal transitions were studied through DSC. Approximately 5 mg of sample was sealed hermetically in an aluminium pan which was heated to 200° C. at 5° C./min, kept there for 10 minutes, subsequently cooled down at 5° C./min to 50° C. and kept isothermal another 10 min before the final heating step to 200° C. at 5° C./min.

The thermal stability of the cross-linked PVDF was investigated through TGA in $N_2$ atmosphere (FIG. 10). The reference PVDF sample shows a good thermal stability with no degradation below 400° C. Cross-linking of up to 30 h results in a slightly decreased thermal stability with less than 10% weight loss below 325° C. In contrast, the 120 h sample has lost most of its thermally stability with already 10% weight loss at 220° C. This can be attributed to 2 effects, (i) the cross-linking results in the presence of more thermal labile secondary amine groups, and (ii) the decreased crystallinity points towards less strong interaction between the polymer chains which would make them more thermally labile [Yu et al. (2009) J. Memb. Sci. 337, 257-265].

Example 7 PH Resistance

Membrane pH stability was tested in caustic (pH=14) and acidic (pH=0) conditions by soaking the membranes for 125 h in respectively 1 M NaOH or 1 M HCl. Filtration performance before and after this treatment was tested using RB in water. Filtrations were performed using the same high-throughput filtration setup as described in 2.4. The 24 h cross-linked membranes were tested for their performance after treatment for 125 h in pH 0 and 14 solutions. The membrane coupons were filtrated before and after the treatment to assess changes in their separation performance (FIG. 11). PVDF is generally not considered for application in extreme caustic conditions because of its susceptibility in these conditions towards dehydrofluorination. As can be seen from the graph, the effect of the extreme pH on the retention is minor. In caustic conditions, an increase of 97% to 100% RB retention is observed, whereas acidic treatment leads to a small decline from 95% to 91%. In permeance, exactly the opposite trends are observed. Acidic conditions lead to a 100% increase in permeance whereas caustic conditions cause a 25% drop. These results show that, although small changes are observed, cross-linked PVDF membranes are applicable in both caustic and acidic conditions. In addition, such acidic or caustic treatment can be used considered as a postsynthetic membrane modification step to shift permeance or retention more towards the desired value, whichever is preferred for the application.

TABLE 8

Comparison with commercial NF membranes applicable in extreme pH (1M HCl and 1M NaOH, data taken from manufacturers website.

| Manufacturer | Product | Material | MWCO (Da) | Permeance ($l/m^2 \cdot h \cdot bar$) | pH-range |
|---|---|---|---|---|---|
| Microdyn-Nadir | NP030 | PES | 500 | 1 | 0-14 |
| Koch | 8040 MPS-34 | PSF | 200 | 2.1 | 0-14 |
| XL-PVDF | 24 h | XL-PVDF | <327 | 0.7 | 0-14 |

The above experiments were repeated whereby the concentration of HCl and NaOH was increased from 1 to 5 M.

TABLE 9 properties of cross-linked PVDF membranes upon treatment with 5M NaOH and 5M HCl

|  |  | Permeance [LMH/bar] | stddev | Retention [%] | stddev |
|---|---|---|---|---|---|
| 5M HCl | before | 0.18 | 0.05 | 99% | 0% |
|  | after | 0.09 | 0.03 | 99% | 0% |
| 5M NaOH | before | 0.16 | 0.02 | 100% | 0% |
|  | after | 0.14 | 0.05 | 98% | 0% |

Example 8. Additional Treatment of Membranes

Cross linked membranes as prepared above were dried and subsequently treated with solvent. Table 10 and FIG. 12 show that the permeance and retention changes after this treatment.

TABLE 10 properties of cross-linked PVDF membranes after drying

| Solvent | Permeance [$l/m^2 \cdot h \cdot bar$] | Retention [%] |
|---|---|---|
| EtOH | 0.10 | 91 |
| iPrOH | 0.02 | 96 |
| ACN | 9.9 | 77 |
| DMF | 2.16 | 32 |
| ACN (after drying) | 146.1 | 98 |
| Tol (after drying) | 0.94 | 98 |
| DMF (after drying) | 2.16 | 75 |
| H2O—DMF | 1.14 | 83 |

Example 9. Filtration of MOF Nanoparticles

Cross-linked PVDF-based ultrafiltration membranes were prepared by dissolving 16 wt % of PVDF in DMF. The solution was stirred until homogeneous and left to degas for several hours before casting a 250 μm layer. The cast film was immediately transferred to a deionized water bath and left there for at least 30 min to ensure complete phase separation. The membranes were cross-linked for 24 h using the conditions described above. The resulting cross-linked ultrafiltration membranes were used for the purification of various prototypical MOF nanoparticles (ZIF-8, ZIF-67, HKUST-1 and UiO-66) prepared in different solvent systems (MeOH, H$_2$O/EtOH/DMF and DMF/HCl. Using diafiltration, all MOF nanoparticles were purified up to >99.9% with nanoparticle rejections higher than 99.9%. No significant changes in particle crystallinity nor particle size were observed.

The above examples show diamine cross-linked PVDF membranes with excellent stability and performance under extreme pH conditions. Cross-linking of loose PVDF membranes resulted in a large improvement in MWCO without compromising permeance. The best membrane performance was obtained after 24 h of cross-linking which decreased the MWCO from 1017 Da to below 327 Da. This was attributed to a swelling and subsequent toplayer densification during the cross-linking process. The cross-linking process itself was characterized through FTIR and EDX based analysis and was shown to proceed with increasing conversion between 0 and 120 h. The physicochemical properties of the membranes were altered quite strongly. A large fraction of the crystallinity was removed and also the thermal and mechanical stability of the membranes is affected, especially for very long cross-linking times.

The invention claimed is:

1. A method of removing a compound from a liquid comprising an organic solvent and/or from a liquid with a pH below 2 or above 12, the method comprising:
   applying the liquid on an uncoated cross-linked non-pyrolysed selective vinyl based halopolymer-membrane having a cross-linked matrix and a mwco of from 100 Da to 1000 Da; and
   optionally applying a pressure on the liquid to pass the liquid through the membrane.

2. The method of claim 1, wherein the liquid comprises organic solvents.

3. The method of claim 1 wherein the liquid is a liquid without organic solvents.

4. The method of claim 1, wherein the liquid has a pH above 12.

5. The method of claim 1, wherein the liquid has a pH below 2.

6. The method of claim 1, wherein the membrane is a cross-linked PVDF membrane.

7. The method of claim 1, wherein the membrane is a solvent activated cross-linked PVDF membrane.

8. The method of claim 1, further comprising drying the membrane before applying the liquid.

9. The method of claim 1, wherein the membrane has an average pore size smaller than 0.1 μm.

10. The method of claim 1, wherein the membrane has a thickness from 10 μm to 600 μm.

11. The method of claim 1, further comprising cleaning the membranes at a pH below 2 or above 12.

12. The method of claim 1, wherein the liquid has a pH below 0 or above 14.

13. The method of claim 1, wherein the method is performed at a temperature up to 150° C.

14. The method of claim 1, wherein the solvent is a solvent that results in swelling or dissolution of the corresponding uncross-linked membrane.

15. The method of claim 1, wherein the cross-linked polymer is obtained by dehydrohalogenation in alkaline media and cross linking.

16. The method of claim 15, wherein the cross linking is performed with a diamine.

17. The method of claim 1, wherein the compound is a heavy metal ion and wherein the liquid is an alkaline or acidic mining waste.

18. The method of claim 1, wherein the compound is a cleaning agent in dairy industry.

* * * * *

UNITED STATES PATENT AND TRADEMARK OFFICE
CERTIFICATE OF CORRECTION

| | |
|---|---|
| PATENT NO. | : 11,554,346 B2 |
| APPLICATION NO. | : 16/963342 |
| DATED | : January 17, 2023 |
| INVENTOR(S) | : Ivo Vankelecom et al. |

It is certified that error appears in the above-identified patent and that said Letters Patent is hereby corrected as shown below:

On the Title Page

Column 2, Item (56), other publications, Line 9, delete "Faguet et al." and insert --Taguet et al.--, therefor.

Signed and Sealed this
Eleventh Day of April, 2023

Katherine Kelly Vidal
*Director of the United States Patent and Trademark Office*